No. 629,230. Patented July 18, 1899.
F. BEAVEN & J. DELPHIN.
SHIELD FOR PNEUMATIC TIRES.
(Application filed Nov. 2, 1898.)

(No Model.)

Witnesses
H. L. Reese
W. H. Zimmerman

Inventors
F. Beaven
J. Delphin.
By H. C. Evertleo
Attorneys

UNITED STATES PATENT OFFICE.

FREDERICK BEAVEN AND JOSEPH DELPHIN, OF CHICAGO, ILLINOIS.

SHIELD FOR PNEUMATIC TIRES.

SPECIFICATION forming part of Letters Patent No. 629,230, dated July 18, 1899.

Application filed November 2, 1898. Serial No. 695,506. (No model.)

*To all whom it may concern:*

Be it known that we, FREDERICK BEAVEN and JOSEPH DELPHIN, citizens of the United States, residing at Chicago, in the county of Cook and State of Illinois, have invented certain new and useful Improvements in Shields for Pneumatic Bicycle and all Vehicle Tires; and we do hereby declare the following to be a full, clear, and exact description of the invention, such as will enable others skilled in the art to which it appertains to make and use the same.

This invention relates to certain new and useful improvements in shields for pneumatic bicycle and other vehicle tires.

The invention has for its object to construct a shield that will prevent the tire from being punctured and which owing to its peculiar construction will retain its elasticity, which is a great objection to the shields now in use.

A further object of our invention is to construct a shield, preferably of metal, having a flat surface which engages in a slit formed in the tread of the tire and projects beyond the sides of the air-chamber. By constructing the shield with a flat surface it retains the same degree of elasticity it originally possessed, which would not be the case if the shield were curved even to the slightest degree.

In describing the invention in detail reference is had to the accompanying drawings, forming a part of this specification, and wherein like figures indicate similar parts throughout the several views, in which—

Figure 1:
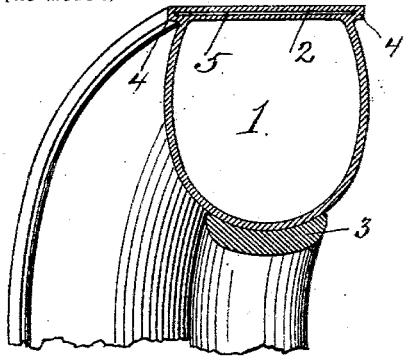
Figure 2:
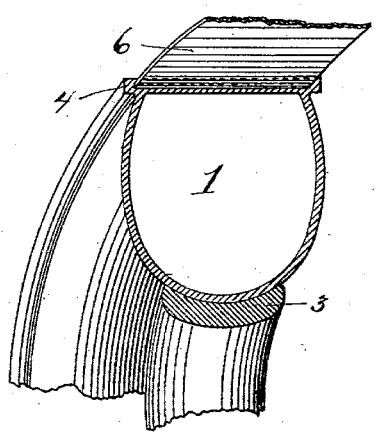
Figure 3:
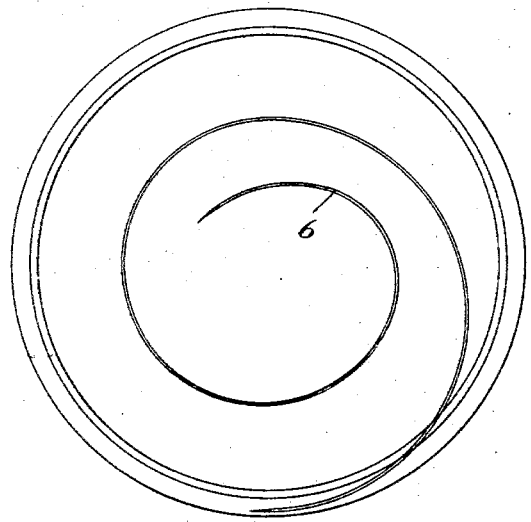
Figure 4:
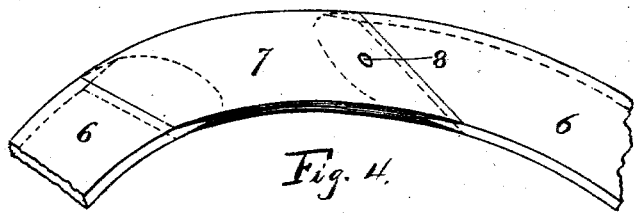

Figure 1 is a cross-sectional view of the tire and rim, showing the location of the slit in the tread of the tire. Fig. 2 is a similar view showing the shield partly inserted. Fig. 3 is a side view in elevation of the tire and shield. Fig. 4 is a perspective view of the fastening-clip.

Referring now to the drawings by reference-numerals, 1 designates the air-chamber of the tire, and 2 the tread.

The portion of the tire which engages the rim 3 of the wheel is the same in shape and construction as the ordinary pneumatic tire, the tread of which, however, is flat and projects beyond the sides of the tire and is somewhat thicker than the body of the tire. This tread is provided on each side with a flange 4, which serves as a protection to the tire.

Arranged circumferentially of the tread and extending nearly the entire width thereof is a slit 5, which is adapted to receive the protecting-strip or shield 6. By reference to the drawings it will be observed that this slit projects beyond the sides of the air-chamber and into the flange 4. By this arrangement it would be impossible for a sharp object to puncture the tire, and should such an object strike the protecting-strip or shield only the outside surface would be punctured or injured, while the air-chamber would be protected and would remain whole.

In Fig. 4 we have shown a clip 7, by means of which the two ends of the protecting-strip or shield 6 may be fastened together. This clip 7 is provided with a slit in each end to receive the beveled ends of the protecting-strip or shield, which may be secured within said clip by a rivet 8 or other suitable fastening means.

It will be observed from the foregoing description that our invention consists in providing a flat protecting-strip and in providing a tire with a slit extending entirely around the same, together with suitable means for securing the protecting-strip or shield together at its ends.

We do not claim, broadly, the idea of placing a protecting-strip or shield in the tread of a pneumatic tire, as we are aware that this has previously been done with shields having a curved surface; but we have learned through actual demonstrations that shields having a curved surface are impracticable, as the elasticity of the metal is destroyed. By constructing the protecting-strip or shield with a flat surface, however, the metal retains the same degree of elasticity when placed in the tire and gives or springs with the tire when striking an object, whereas in the curved protecting-strip or shield none of this elasticity is obtained.

It will be noted that various changes may be made in the details of construction without departing from the general spirit of our invention.

Having fully described our invention, what we claim as new, and desire to secure by Letters Patent, is—

A pneumatic tire which is formed with a flat tread extending beyond the sides of the air-chamber within the tire, said flat tread being provided with a central slit extending circumferentially thereof and being of greater width than the air-chamber of the tire, a metallic strip fitting within said slit and having each of its ends beveled, a clip having a slit in each end thereof to receive said beveled ends of the metallic strip, and means for securing said ends within the clip, substantially as described.

In testimony whereof we affix our signatures in presence of two witnesses.

FREDERICK BEAVEN.
JOSEPH DELPHIN.

Witnesses:
GEORGE BAKER,
EMIL SIELAFF.